(12) United States Patent
Karjala et al.

(10) Patent No.: US 10,815,375 B2
(45) Date of Patent: Oct. 27, 2020

(54) COMPOSITIONS COMPRISING ETHYLENE-CARBON MONOXIDE COPOLYMERS

(71) Applicant: Dow Global Technologies LLC, Midland, MI (US)

(72) Inventors: Teresa P. Karjala, Freeport, TX (US); Alfred E. Vigil, Jr., Freeport, TX (US); Frances Olajide, Jr., Freeport, TX (US); Lori L. Kardos, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/096,847

(22) PCT Filed: Apr. 19, 2017

(86) PCT No.: PCT/US2017/028339
§ 371 (c)(1),
(2) Date: Oct. 26, 2018

(87) PCT Pub. No.: WO2017/189299
PCT Pub. Date: Nov. 2, 2017

(65) Prior Publication Data
US 2019/0136050 A1    May 9, 2019

Related U.S. Application Data

(60) Provisional application No. 62/329,340, filed on Apr. 29, 2016.

(51) Int. Cl.
*C08L 73/00* (2006.01)
*C08F 2/34* (2006.01)
(Continued)

(52) U.S. Cl.
CPC .............. *C08L 73/00* (2013.01); *B32B 27/32* (2013.01); *C08F 2/34* (2013.01); *C08F 20/00* (2013.01);
(Continued)

(58) Field of Classification Search
CPC ........ C08L 73/00; C08L 23/08; C08F 210/02; C08F 2/34
See application file for complete search history.

(56) References Cited

U.S. PATENT DOCUMENTS 3,676,401 A    7/1972  Henry
3,860,538 A    1/1975  Guillet et al.
(Continued)

FOREIGN PATENT DOCUMENTS

EP    0230143 B1    11/1989
GB    1448062 A     9/1976
WO    91/18944 A1   12/1991

*Primary Examiner* — Shane Fang
(74) *Attorney, Agent, or Firm* — Quarles & Brady LLP (57) ABSTRACT

The invention provides a composition comprising an ethylene-based polymer and wherein the ethylene-based polymer has the following properties: (A) a CO content from greater than 0 to less than 10 weight percent CO (carbon monoxide), based on the weight of the polymer, and (B) a melt index (I2) from 0.1 to less than 3 g/10 min; and (C) a density from 0.923 to 0.928 g/cc; and wherein the ethylene-based polymer has a melting point, Tm, in ° C., that meets the following relationship: Tm (° C.)<601.4*(Density N in g/cc)−447.8° C.

10 Claims, 1 Drawing Sheet

(51) Int. Cl.
*C08L 23/08* (2006.01)
*C09D 173/00* (2006.01)
*C08J 5/18* (2006.01)
*C09D 123/08* (2006.01)
*C08F 20/00* (2006.01)
*C09J 173/00* (2006.01)
*C08F 210/18* (2006.01)
*B32B 27/32* (2006.01)
*C08G 67/02* (2006.01)
*C08F 210/02* (2006.01)

(52) U.S. Cl.
CPC .......... *C08F 210/02* (2013.01); *C08F 210/18* (2013.01); *C08G 67/02* (2013.01); *C08J 5/18* (2013.01); *C08L 23/08* (2013.01); *C09D 123/08* (2013.01); *C09D 173/00* (2013.01); *C09J 173/00* (2013.01); *C08F 2500/08* (2013.01); *C08F 2500/12* (2013.01); *C08F 2500/17* (2013.01); *C08F 2800/10* (2013.01); *C08L 2203/16* (2013.01)

(56) References Cited

U.S. PATENT DOCUMENTS

| | | |
|---|---|---|
| 4,714,741 A | 12/1987 | Balduff et al. |
| 4,962,164 A | 10/1990 | Jabarin et al. |
| 5,178,960 A | 1/1993 | Cook |
| 6,333,115 B1 | 12/2001 | Krebs |
| 6,558,809 B1 | 5/2003 | Kelch et al. |
| 8,859,671 B2 | 10/2014 | Tice et al. |
| 9,523,015 B2 | 12/2016 | Karjala et al. |
| 9,856,338 B2 | 1/2018 | Berbee et al. |
| 2017/0107315 A1 | 4/2017 | Osby et al. |

FIG. 1

COMPOSITIONS COMPRISING ETHYLENE-CARBON MONOXIDE COPOLYMERS

REFERENCE TO RELATED APPLICATIONS

The present application claims the benefit of U.S. Provisional Application 62/329,340, filed Apr. 29, 2016.

BACKGROUND OF THE INVENTION

Compositions comprising ethylene-based polymers that contain carbon monoxide (CO), e.g., ethylene/carbon monoxide copolymers (ECO), are used in a wide variety of packaging applications For packaging applications that require good flexibility (such as stretching, elongation or elastic recovery), these polymers preferably have a low modulus (for example, 1% and/or 2% secant modulus).

ECO copolymers are known. For example, WO 2014/105608 describes a low density polyethylene comprising from greater than zero to 10 weight percent (wt %) CO. These polymers have a melt index (MI, I2) from 3 to 30. WO 2015/200426 describes the use of a rheology modifying agent (referred to sometimes as a branching agent) in a high pressure process for making ECO copolymers. WO 2015/200430 describes the use of CO in combination with process enhancements to broaden the molecular weight distribution of a high pressure LDPE to provide high melt strength with low extractables. EP 0 984 052 describes terpolymers of an alpha-olefin, CO and an ethylenically unsaturated carboxylic ester monomer in combination with a thermosetting resin.

Ethylene-based polymers used for coatings and films are disclosed in the following references: International Publication Nos. WO 2011/071843, WO 1991/18944; LUSP 5,178, 960, 3,860,538, 4,714,741, 6,558,809, 4,962,164, 3,676, 401; GB 1 448 062; EP 0 230 143 B1; Ward et al., *Ethylene-Carbon Monoxide Extrudable Adhesive Copolymers for Polyvinylidene Chloride*, June 1988 Tappi Journal, pp. 140-144; and Scott et al., *Degradable Polymers. Principles and Applications*, Chapter 8: Ethylene-carbon monoxide copolymers, pp. 156-168, Chapman and Hall (1995).

SUMMARY OF THE INVENTION

The invention provides a composition comprising an ethylene-based polymer wherein the ethylene-based polymer has the following properties:
(A) a CO (carbon monoxide) content from greater than 0 to less than 10 weight percent CO, based on the weight of the polymer; and
(B) a melt index (I2) from 0.1 to less than 3 g/10 min; and
(C) a density from 0.923 to 0.928 g/cc;
wherein the ethylene-based polymer has a melting point, Tm, in ° C., that meets the following relationship: Tm (° C.)<601.4*(Density in g/cc)−447.8° C. In one embodiment, the ethylene-based polymer is formed from a high pressure, free-radical polymerization.

DETAILED DESCRIPTION

As discussed above, the invention provides a composition comprising an ethylene-based polymer and wherein the ethylene-based polymer has the following properties:
(A) a CO (carbon monoxide) content from greater than 0 to less than 10 weight percent CO, based on the weight of the polymer; and
(B) a melt index (I2) from 0.1 to less than 3 g/10 min;
(C) a density from 0.923 to 0.928 g/cc;
wherein the ethylene-based polymer has a melting point, Tm, in ° C., that meets the following relationship: Tm (° C.)<601.4*(Density in g/cc)−447.8° C.

In one embodiment, the ethylene-based copolymer is formed from a high pressure, free-radical polymerization.

The inventive composition may comprise a combination of two or more embodiments as described herein.

The ethylene-based polymer may comprise a combination of two or more embodiments as described herein.

In one embodiment, the ethylene-based polymer has a CO content from greater than 0 to less than, or equal to, 6 weight percent CO (carbon monoxide), based on the weight of the polymer.

In one embodiment, the ethylene-based polymer has a CO content from greater than 0 to less than, or equal to, 4 weight percent CO (carbon monoxide), based on the weight of the polymer.

In one embodiment, the ethylene-based polymer has a CO content from greater than 0, or greater than, or equal to, 0.01, or greater than, or equal to, 0.02, or greater than, or equal to, 0.05, to less than, or equal to, 2.0, or less than, or equal to, 1.5, or less than, or equal to, 1.2, or less than or equal to 1.0, or less than, or equal to, 0.9, or less than or equal to 0.8, weight percent CO, based on the weight of the polymer.

In one embodiment, the ethylene-based polymer has a CO content from 0.05 to 6.0 weight percent CO, further from 0.1 to 4, further from 0.2 to 2.0, further from 0.20 to 1.0, further from 0.2 to 0.9, further from 0.2 to 0.8, based on the weight of the polymer.

In one embodiment, the ethylene-based polymer has a CO content from 0.05 to 30 weight percent CO, further from 0.1 to 25, further from 0.2 to 20, further from 0.20 to 15, further from 0.2 to 10, further from 0.5 to less than, or equal to, 3 based on the weight of the polymer.

As used herein, the CO content refers to polymerized CO in the polymer.

In one embodiment, the ethylene-based polymer comprises greater than, or equal to, 80 weight percent, further greater than, or equal to, 85 weight percent, polymerized ethylene, based on the weight of the polymer.

In one embodiment, the ethylene-based polymer comprises greater than, or equal to, 90 weight percent, further greater than, or equal to, 95 weight percent, polymerized ethylene, based on the weight of the polymer.

In one embodiment, the ethylene-based polymer comprises greater than, or equal to, 97 weight percent, further greater than, or equal to, 98 weight percent, polymerized ethylene, based on the weight of the polymer.

In one embodiment, the ethylene-based polymer has a melting point, Tm in ° C., that meets the following relationship: Tm (° C.)<601.4*(Density in g/cc)−447.8 (° C.).

In one embodiment, the ethylene-based polymer has a melting point, Tm, in ° C., that meets the following relationship: Tm (° C.)<601.4*(Density in g/cc)−448.5 (° C.).

In one embodiment, the ethylene-based polymer has a melting point, Tm, in ° C., that meets the following relationship: Tm (° C.)>601.4*(Density in g/cc)−451.5 (° C.).

In one embodiment, the ethylene-based polymer has a melting point, Tm, in ° C., that meets the following two relationships: Tm (° C.)<601.4*(Density in g/cc)−448.5 (° C.); and Tm (° C.)>601.4*(Density in g/cc)−451.5 (° C.).

In one embodiment, the ethylene-based polymer has a melting point, Tm, in ° C., that meets the following two relationships: Tm (° C.)<601.4*(Density in g/cc)−447.8 (° C.); and Tm (° C.)>601.4*(Density in g/cc)−451.5 (° C.).

In one embodiment, the ethylene-based polymer has a density from 0.923 to 0.928 g/cc, or from 0.923 to 0.927 g/cc (1 cc=1 cm$^3$).

In one embodiment, the ethylene-based polymer has a density from 0.923 to 0.9275 g/cc, or from 0.923 to 0.927 g/cc.

In one embodiment, the ethylene-based polymer has a density from 0.924 to 0.928 g/cc, or from 0.924 to 0.927 g/cc, or from 0.924 to 0.926 g/cc.

In one embodiment, the ethylene-based polymer has a density from 0.925 to 0.928 g/cc, or from 0.925 to 0.927 g/cc.

In one embodiment, the ethylene-based polymer has a density from 0.926 to 0.928 g/cc, or from 0.926 to 0.927 g/cc.

In one embodiment, the ethylene-based polymer has a density from 0.920 to 0.928 g/cc, or from 0.920 to 0.927 g/cc (I cc=1 cm$^3$).

In one embodiment, the ethylene-based polymer has a density from 0.921 to 0.928 g/cc, or from 0.921 to 0.927 g/cc (1 cc=1 cm$^3$).

In one embodiment, the ethylene-based polymer has a density from 0.922 to 0.928 g/cc, or from 0.922 to 0.927 g/cc (I cc=1 cm$^3$).

In one embodiment, the ethylene-based polymer has a density greater than or equal to 0.920 g/cc, or greater than or equal to 0.921 g/cc, or greater than or equal to 0.922 g/cc. In a further embodiment the ethylene-based polymer has density less than or equal to 0.930 g/cc, or less than or equal to 0.929 g/cc, or less than or equal to 0.928 g/cc.

In one embodiment, the ethylene-based polymer has a density of less than 0.928 g/cc.

In one embodiment, the ethylene-based polymer has a density of less than 0.927 g/cc.

In one embodiment, the ethylene-based polymer has a melting temperature, Tm, from 101° C. to 113° C., further from 102° C. to 113° C., further from 103° C. to 113° C., as determined by DSC (peak melting temperature).

In one embodiment, the ethylene-based polymer has a melting temperature, Tm, from 105° C. to 113° C., further from 107° C. to 113° C., further from 109° C. to 113° C., as determined by DSC (peak melting temperature).

In one embodiment, the ethylene-based polymer has a melting temperature, Tm, greater than, or equal to, 102° C., further greater than, or equal to, 103° C., further greater than, or equal to, 104° C. as determined by DSC (peak melting temperature).

In one embodiment, the ethylene-based polymer has a melting temperature, Tm, greater than 107° C., as determined by DSC (peak melting temperature).

In one embodiment, the ethylene-based polymer has a melting temperature, Tm, from 105° C. to 110° C., as determined by DSC (peak melting temperature).

In one embodiment, the ethylene-based polymer has an amyl group level greater than, or equal to, 0.5 amyl group per 1000 carbon atoms, as determined by 13C NMR. In a further embodiment, the ethylene-based polymer has an amyl (C5) group level greater than, or equal to, 1.0 amyl group per 1000 carbon atoms, as determined by 13C NMR.

In one embodiment, the ethylene-based polymer has an amyl group level greater than, or equal to, 1.2 amyl group per 1000 carbon atoms, further greater than, or equal to, 1.3 amyl group per 1000 carbon atoms, further greater than, or equal to, 1.4 amyl group per 1000 carbon atoms, further greater than, or equal to, 1.5 amyl group per 1000 carbon atoms as determined by 13C NMR. In one embodiment, the ethylene-based polymer has an amyl group level less than, or equal to, 5.0 amyl group per 1000 carbon atoms, further less than, or equal to, 4.5 amyl group per 1000 carbon atoms, further less than, or equal to, 4.0 amyl group per 1000 carbon atoms, further less than, or equal to, 3.5 amyl group per 1000 carbon atoms, further less than, or equal to, 3.0 amyl group per 1000 carbon atoms, as determined by 13C NMR.

In one embodiment, the ethylene-based polymer has an amyl group level greater than, or equal to, 1.50 amyl group per 1000 carbon atoms, further greater than, or equal to, 1.55 amyl group per 1000 carbon atoms, further greater than, or equal to, 1.60 amyl group per 1000 carbon atoms, as determined by 13C NMR.

In one embodiment, the ethylene-based polymer has a C6+ group level less than, or equal to, 3.0 C6+ group per 1000 carbon atoms, as determined by 13C NMR. In a further embodiment, the ethylene-based polymer has a C6+(per 1000 C) group level less than, or equal to, 2.8 C6+ group per 1000 carbon atoms, or equal to or less than, 2.6 C6+ group per 1000 carbon atoms as determined by 13C NMR.

In one embodiment, the ethylene-based polymer has a C6+ group level greater than, or equal to, 0.5 C6+ group per 1000 carbon atoms, as determined by 13C NMR. In a further embodiment, the ethylene-based polymer has a C6+(per 1000 C) group level greater than, or equal to, 1.0 C6+ group per 1000 carbon atoms, or equal to or greater than, 1.5 C6+ group per 1000 carbon atoms as determined by 13C NMR.

In one embodiment, the ethylene-based polymer has a molecular weight distribution (GPC(conv) Mw/Mn) from 4.0 to 20.0, further from 4.2 to 18.0, further from 4.5 to 15.0, as determined by the conventional calibration of TDGPC.

In one embodiment, the ethylene-based polymer has a molecular weight distribution (GPC(conv) Mw/Mn) from 4.0 to 10.0, further from 4.2 to 9.0, further from 4.5 to 8.0, further from 4.5 to 7.0, further from 5.0 to 7.0, further from 5.0 to 6.5, as determined by the conventional calibration of TDGPC.

In one embodiment, the ethylene-based polymer has a Mn (conv) from 15,000 to 25,000, g/mol, further from 16,000 to 20,000 g/mol, further from 17,000 to 18,500 g/mol, as determined by the conventional calibration of TDGPC.

In one embodiment, the ethylene-based polymer has a Mw (conv) from 100,000 to 130,000, g/mol, further from 105,000 to 120,000 g/mol, further from 110,000 to 120,000 g/mol, as determined by the conventional calibration of TDGPC.

In one embodiment, the ethylene-based polymer has a Mz (conv) from 375,000 to 425,000, g/mol, further from 380,000 to 415,000 g/mol, further from 390,000 to 415,000 g/mol, as determined by the conventional calibration of TDGPC.

In one embodiment, the ethylene-based polymer has a Mw (abs) from 200,000 to 275,000, g/mol, further from 210,000 to 260,000 g/mol, further from 220,000 to 250,000 g/mol, as determined by light scattering detector in TDGPC.

In one embodiment, the ethylene-based polymer has a Mz (abs)/Mw (abs) from 11.0 to 17.0, further from 12.0 to 16.0, further from 13.0 to 16.0, as determined by light scattering detector in TDGPC.

In one embodiment, the ethylene-based polymer has a $LCB_f$ from 1.7 to 2.3, further from 1.8 to 2.2, further from 1.9 to 2.2.

In one embodiment, the ethylene-based polymer has a gpcBR from 1.6 to 2.1, further from 1.7 to 2.0, further from 1.8 to 1.9.

In one embodiment, the ethylene-based polymer has a melt index (I2) from 0.1 to less than 3.0, further from 0.2 to 2.0, or further from 0.3 to 1.0 g/10 min (190° C./2.16 kg).

In one embodiment, the ethylene-based polymer has a melt index (I2) from 0.3 to 0.8, further from 0.4 to 0.7, further from 0.4 to 0.6 g/10 min (190° C./2.16 kg).

In one embodiment, the ethylene-based polymer has a 1% secant modulus (measured on a compression molded plaque) of a minimum of 28,000 psi, or a minimum of 29,000 psi, or a minimum of 30,000 psi.

In one embodiment, the ethylene-based polymer has a 1% secant modulus (measured on a compression molded plaque) of a maximum of 35,000 psi, or a maximum of 34,000 psi, or a maximum of 33,800 psi.

In one embodiment, the ethylene-based polymer has a 1% secant modulus (measured on a compression molded plaque) in the range of 28,000 to 35,000 psi, or in the range of 29,000 to 34,000 psi, or in the range of 30,000 to 34,000 psi.

In one embodiment, the ethylene-based polymer has a 2% secant modulus (measured on a compression molded plaque) of a minimum of 28,000 psi, or a minimum of 29,000 psi, or a minimum of 30,000 psi.

In one embodiment, the ethylene-based polymer has a 2% secant modulus (measured on a compression molded plaque) of a maximum of 34,000 psi, or a maximum of 33,000 psi, or a maximum of 32,000 psi.

In one embodiment, the ethylene-based polymer has a 2% secant modulus (measured on a compression molded plaque) in the range of 27,000 to 34,000 psi, or in the range of 28,000 to 34,000 psi, or in the range of 28,000 to 33,000 psi, or in the range of 29,000 to 32,000 psi.

In one embodiment, the ethylene-based polymer has a melt strength of at least 10 cN, or at least 11 cN, or at least 12 cN, or at least 13 cN.

In one embodiment, the ethylene-based polymer has a melt strength at 190° C. of less than or equal to 18 cN, or less than or equal to 17 cN.

In one embodiment, the ethylene-based polymer has a melt strength at 190° C. of less than or equal to 17 centiNewtons (cN).

In one embodiment, the ethylene-based polymer has a melt strength in the range of 10 to 17 cN, or in the range of 11 to 16 cN, or in the range of 12 to 15 cN.

In one embodiment, the ethylene-based polymer is a low density polyethylene that comprises, in polymerized form, ethylene monomer and CO comonomer. In a further embodiment, the ethylene-based polymer comprises ≥95 wt %, or ≥98 wt %, or ≥99 wt %, or ≥99.5 wt % of the sum of polymerized ethylene and CO, based on the weight of the polymer.

In one embodiment, the ethylene-based polymer comprises, in polymerized form, ethylene and CO as the only monomer types. In a further embodiment, the ethylene-based polymer comprises a majority amount of polymerized ethylene, based on the weight of the polymer. In a further embodiment, the ethylene-based polymer comprises greater than, or equal to, 90 weight percent, further greater than, or equal to, 95 weight percent, polymerized ethylene, based on the weight of the polymer. In a further embodiment, the ethylene-based polymer comprises greater than, or equal to, 95 weight percent, of the sum of polymerized ethylene and CO, based on the weight of the polymer.

In one embodiment, the ethylene-based polymer is an ethylene-carbon monoxide copolymer.

In one embodiment, the ethylene-based polymer has a melt viscosity at 0.1 rad/s and 190° C.≥20,000 Pa·s, or ≥20,500 Pa·s, or ≥21,000 Pa·s. In one embodiment, the ethylene-based polymer has a melt viscosity at 0.1 rad/s and 190° C.≤22,500 Pa·s, or ≤, 22,000 Pa·s.

In one embodiment, the ethylene-based polymer has a viscosity ratio (V0.1/V100, at 190° C.) from 29.0 to 32.0, more preferably from 29.5 to 31.5, most preferably from 30.0 to 31.0.

In one embodiment, the ethylene-based polymer has a tan delta (measured at 0.1 rad/s at 190° C.) from 1.90 to 2.20, or from 1.95 to 2.15, or from 2.00 to 2.10.

In one embodiment, the ethylene-based polymer has a percent crystallinity from 45.0 to 50.0, or from 46.0 to 49.0, or from 47.0 to 48.0.

In one embodiment, the ethylene-based polymer is present at greater than, or equal to, 10 weight percent, based on the weight of the composition.

In one embodiment, the ethylene-based polymer is present in an amount from 10 to 50 weight percent, further from 20 to 40 weight percent, based on the weight of the composition.

In one embodiment, the ethylene-based polymer is present in an amount from 60 to 90 weight percent, further from 65 to 85 weight percent, based on the weight of the composition.

In one embodiment, the ethylene-based polymer is present in an amount from 1.0 to 10 weight percent, further from 1.5 to 5.0 weight percent, based on the weight of the composition.

In one embodiment, the composition further comprises a second ethylene-based polymer. In a further embodiment, the second ethylene-based polymer is selected from a ILDPE, an ethylene/alpha-olefin copolymer, or a combination thereof.

In one embodiment, the composition further comprises another ethylene-based polymer that differs in one or more properties, such as density, melt index, comonomer, comonomer content, etc., from the inventive ethylene-based polymer. Suitable other ethylene-based polymers include, but are not limited to, DOWLEX Polyethylene Resins, TUFLIN Linear Low Density Polyethylene (LLDPE) Resins, AFFINITY Polyolefin Plastomers, ENGAGE Polyolefin Elastomers, ELITE and/or ELITE AT Enhanced Polyethylene Resins (all available from The Dow Chemical Company), high density polyethylenes (d≥0.96 g/cc), medium density polyethylenes (density from 0.935 to 0.955 g/cc), EXCEED polymers and ENABLE polymers (both from ExxonMobil), LDPE, and EVA (ethylene vinyl acetate).

In one embodiment, the composition further comprises a propylene-based polymer. Suitable propylene-based polymers include polypropylene homopolymers, propylene/α-olefin interpolymers and copolymers, and propylene/ethylene interpolymers and copolymers.

In one embodiment, the composition further comprises a heterogeneously branched ethylene/α-olefin interpolymer, and preferably a heterogeneously branched ethylene/α-olefin copolymer. In one embodiment, the heterogeneously branched ethylene/α-olefin interpolymer, and preferably a heterogeneously branched ethylene/α-olefin copolymer, has a density from 0.89 to 0.94 g/cc, further from 0.90 to 0.93 g/cc. In a further embodiment, the composition comprises from 1 to 99 weight percent, further from 15 to 85 weight percent, of the inventive ethylene-based polymer, based on the weight of the composition.

In one embodiment, the composition comprises less than 5 ppm, further less than 2 ppm, further less than 1 ppm, and further less than 0.5 ppm, sulfur, based on the weight of the composition.

In one embodiment, the composition does not contain sulfur.

In one embodiment, the ethylene-based polymer does not contain a group derived from a rheology modifying agent, for example, see such agents disclosed in WO 2015/200426.

In one embodiment, the composition comprises from 1.5 to 80 weight percent of an inventive ethylene-based polymer. In one embodiment, the composition further comprises a second ethylene-based polymer. In one embodiment, the composition further comprises LDPE, or an ethylene/alpha-olefin copolymer, or both. In one embodiment, the composition further comprises LLDPE.

In one embodiment the ethylene-based polymer is a low density, high pressure ethylene-CO copolymer.

In one embodiment, the composition comprises from 1.5 to 20 weight percent of an inventive ethylene-based polymer. In a further embodiment, the composition further comprises a LLDPE.

In one embodiment, the composition comprises from 20 to 80 weight percent, further from 50 to 80 weight percent, of an inventive ethylene-based polymer. In a further embodiment, the composition further comprises a LLDPE.

An inventive composition may comprise a combination of two or more embodiments as described herein.

An inventive ethylene-based polymer may comprise a combination of two or more embodiments as described herein.

The invention also provides a process for forming an inventive ethylene-based polymer of any of the previous embodiments, the process comprising polymerizing ethylene, carbon monoxide, and optionally at least one other comonomer, in at least one tubular reactor.

The invention also provides a process for forming an inventive ethylene-based polymer of any of the previous embodiments, the process comprising polymerizing ethylene, carbon monoxide, and optionally at least one other comonomer, in at least one autoclave reactor.

The invention also provides a process for forming an inventive ethylene-based polymer of any of the previous embodiments, the process comprising polymerizing ethylene, carbon monoxide, and optionally at least one other comonomer, in a combination of at least one tubular reactor and at least one autoclave reactor.

An inventive process may comprise a combination of two or more embodiments as described herein.

The invention also provides an article comprising at least one component formed from the composition of one or more embodiments described herein.

An inventive article may comprise a combination of two or more embodiments as described herein.

The invention also provides a coating formed from the composition of one or more embodiments described herein.

An inventive coating may comprise a combination of two or more embodiments as described herein.

Process

For producing an inventive ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), or from 1000 to 2000 m. The beginning of a reaction zone for either type of reactor is typically defined by the side injection of either initiator for the reaction, ethylene, chain transfer agent (or telomer), comonomer(s), as well as any combination thereof. A high pressure process can be carried out in autoclave or tubular reactors having one or more reaction zones, or in a combination of autoclave and tubular reactors, each comprising one or more reaction zones.

A chain transfer agent (CTA) can be used to control molecular weight. In one embodiment, one or more chain transfer agents (CTAs) are added to an inventive polymerization process. Typical CTAs that can be used include, but are not limited to, propylene, isobutane, n-butane, I-butene, methyl ethyl ketone, acetone, and propionaldehyde. In one embodiment, the amount of CTA used in the process is from 0.03 to 10 weight percent of the total reaction mixture.

Ethylene used for the production of the ethylene-based polymer may be purified ethylene, which is obtained by removing impurities from a loop recycle stream, or by using a reaction system configuration, such that only fresh ethylene is used for making the inventive polymer. It is not typical that only purified ethylene is required to make the ethylene-based polymer. In such cases, ethylene from the recycle loop may be used.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent (by the combined weight) of one or more additives, based on the weight of the inventive polymer composition.

In one embodiment, the polymers of this invention are treated with one or more stabilizers, for example, antioxidants, such as IRGANOX 1010, IRGANOX 1076 and IRGAFOS 168 (Ciba Specialty Chemicals; Glattbrugg, Switzerland). In general, the polymers are treated with one or more stabilizers before extrusion or other melt processes. Processing aids, such as plasticizers, include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils, useful as processing aids, include white mineral oil such as KAYDOL oil (Chemtura Corp.; Middlebury, Conn.) and SHELLFLEX 371 naphthenic oil (Shell Lubricants; Houston, Tex.). One other suitable oil is TUFFLO oil (Lyondell Lubricants; Houston, Tex.).

Blends and mixtures of the inventive polymer with other polymers may be performed. Suitable polymers for blending with the inventive polymer include natural and synthetic polymers. Exemplary polymers for blending include propylene-based polymers (for example, impact modifying polypropylene, isotactic polypropylene, atactic polypropylene, and random ethylene/propylene copolymers), various types of ethylene-based polymers, including high pressure, free-radical LDPE, LLDPE prepared with Ziegler-Natta catalysts, PE (polyethylene) prepared with single site catalysts, including multiple reactor PE ("in reactor" blends of Ziegler-Natta PE and single site catalyzed PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), EVA, ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers, such as olefin plastomers and elastomers, ethylene and propylene-based copolymers (for example, polymers available under the trade designation VERSIFY Plastomers & Elastomers (The Dow Chemical Company) and VISTA-MAXX (ExxonMobil Chemical Co.) can also be useful as components in blends comprising the inventive polymer).

Applications

The polymers of this invention may be employed in a variety of conventional thermoplastic fabrication processes to produce useful articles, including, but not limited to, monolayer films and sheets, multilayer films and sheets; molded articles, such as blow molded, injection molded, or rotomolded articles; coatings; fibers; and woven or nonwoven fabrics.

An inventive polymer may be used in a variety of films, including but not limited to, extrusion coating, food packaging, consumer, industrial, agricultural (applications or films), lamination films, fresh cut produce films, meat films, cheese films, candy films, clarity shrink films, collation shrink films, stretch films, silage films, greenhouse films, fumigation films, liner films, stretch hood, heavy duty shipping sacks, pet food, sandwich bags, sealants, and diaper backsheets.

An inventive polymer is also useful in other direct end-use applications. An inventive polymer may be used for wire and cable coating operations, in sheet extrusion for vacuum forming operations, and forming molded articles, including the use of injection molding, blow molding, or rotomolding processes.

Other suitable applications for the inventive polymers include elastic films and fibers; soft touch goods, such as appliance handles; gaskets and profiles; auto interior parts and profiles; foam goods (both open and closed cell); impact modifiers for other thermoplastic polymers, such as high density polyethylene, or other olefin polymers; cap liners; and flooring.

Definitions

The phrase "high pressure, free-radical polymerization process," as used herein, refers to a free radical initiated polymerization carried out at an elevated pressure of at least 1000 bar (100 MPa).

The term "low density high pressure ethylene-CO copolymer, as used herein refers to an ethylene-CO copolymer polymerized using a free radical polymerization carried out at an elevated pressure of at least 1000 bar (100 MPa).

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer.

The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term "ethylene-based polymer," as used herein, refers to a polymer that comprises a majority amount of polymerized ethylene monomer (based on weight of the polymer) and, optionally, may contain at least one comonomer.

The term "ethylene/α-olefin interpolymer," as used herein, refers to an interpolymer that comprises a majority amount of polymerized ethylene monomer (based on the weight of the interpolymer) and at least one α-olefin.

The term. "ethylene/α-olefin copolymer," as used herein, refers to a copolymer that comprises a majority amount of polymerized ethylene monomer (based on the weight of the copolymer), and an α-olefin, as the only two monomer types.

The term "propylene-based polymer," as used herein, refers to a polymer that comprises a majority amount of polymerized propylene monomer (based on weight of the polymer) and, optionally, may comprise at least one comonomer.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density

Samples for density measurements were prepared according to ASTM D 4703-10 Annex A1 Procedure C. Approximately 7 g of sample was placed in a "2"×2"×135 mil thick" mold, and this was pressed at 374° F. (190° C.) for six minutes at 3,000 $lb_f$(0.0133 MN). Then the pressure was increased to 30,000 $lb_f$(0.133 MN) for four minutes. This was followed by cooling at 15° C. per minute, at 30,000 $lb_f$ (0.133 MN), to approximately a temperature of 40° C. The "2"×2"×135 mil" polymer sample (plaque) was then removed from the mold, and three samples were cut from the plaque with a ½"×1" die cutter. Density measurements were made within one hour of sample pressing, using ASTM D792-08, Method B. Density was reported as an average of three measurements.

Melt Index

Melt index (MI), or I2, was measured in accordance with ASTM D 1238-10, Condition 190° C./2.16 kg, Procedure B, and was reported in grams eluted per 10 minutes (g/10 min).

Hexane Extractables

Polymer pellets (from the polymerization pelletization process, without further modification; approximately 2.2 grams per one "I-inch by 1-inch" square film) were pressed in a Carver Press at a thickness of 3.0-4.0 mils. The pellets were pressed at 190° C. for 3 minutes, at 40,000 lb$_f$ (0.178 MN). Non-residue gloves (PIP*CleanTeam*CottonLisle Inspection Gloves, Part Number: 97-501) were worn to prevent contamination of the film with residual oils from the hands of the operator. Each film was trimmed to a "1-inch by 1-inch" square, and weighed (2.5±0.05 g). The films were extracted for two hours, in a hexane vessel, containing about 1000 ml of hexane, at 49.5±0.5° C., in a heated water bath. The hexane was an isomeric "hexanes" mixture (for example, Hexanes (Optima), Fisher Chemical, high purity mobile phase for HPLC and/or extraction solvent for GC applications). After two hours, the films were removed, rinsed in clean hexane, and dried in a vacuum oven (80±5° C.) at full vacuum (ISOTEMP Vacuum Oven, Model 281A, at approximately 30 inches Hg) for two hours. The films were then placed in a desiccator, and allowed to cool to room temperature for a minimum of one hour. The films were then reweighed, and the amount of mass loss due to extraction in hexane was calculated. This method is based on 21 CRF 177.1520 (d)(3)(ii), with one deviation from FDA protocol by using hexanes instead of n-hexane. The average of three measurements was reported.

Nuclear Magnetic Resonance ($^{13}$C NMR)

Each sample was prepared by adding approximately "3 g of a 50/50 mixture of tetrachloroethane-d2/orthodichlorobenzene, containing 0.025 M Cr(AcAc)$_3$," to a "0.25 to 0.40 g polymer sample," in a 10 mm NMR tube. The sample was then dissolved and homogenized by heating the tube, and its contents to 150° C., using a heating block and heat gun. Each dissolved sample was visually inspected to ensure homogeneity. All data were collected using a Bruker 400 MHz spectrometer, equipped with a Bruker Dual DUL high-temperature CryoProbe. The data was acquired using a six second pulse repetition delay, 90-degree flip angles, and inverse gated decoupling, with a sample temperature of 120° C. All measurements were made on non-spinning samples in locked mode. The $^{13}$C NMR chemical shifts were internally referenced to the EEE triad at 30.0 ppm. The C6+ value was a direct measure of C6+ branches in LDPE, where the long branches were not distinguished from chain ends. The 32.2 ppm peak, representing the third carbon from the end of all chains or branches of six or more carbons, was used to determine the C6+ value. Other peaks of interest are listed in Table A.

TABLE A $^{13}$C NMR Peaks of Sample Polymers

| Branch Type | Peak(s) integrated | Identity of the integrated carbon peak(s) |
| --- | --- | --- |
| 1,3 diethyl | About 10.5 to 11.5 ppm | 1,3 diethyl branch methyls |
| C1 | About 19.75 to 20.50 ppm | C1, methyls |

TABLE A-continued $^{13}$C NMR Peaks of Sample Polymers

| Branch Type | Peak(s) integrated | Identity of the integrated carbon peak(s) |
| --- | --- | --- |
| C2 on Quat Carbon | About 7.7 to 8.6 ppm | 2 ethyl groups on a quaternary carbon |
| C4 | About 23.3 to 23.5 ppm | Second CH$_2$ in a 4-carbon branch, counting the methyl as the first C |
| C5 | About 32.60 to 32.80 ppm | Third CH$_2$ in a 5-carbon branch, counting the methyl as the first C |

Data Analysis (CO Content)

The number of CO units per 1000 ethylene carbons is determined by setting the full spectrum integral to 1000, and integrating the peaks corresponding to A2 and A3 in Table B. These integrals are averaged and divided by 2 to give moles CO per 1000 carbons from ethylene. The C=O carbon is not included in the full spectrum integral. In the ECO, the mol % CO and the wt % CO values are the same. Mol % CO is calculated from: CO units/1000 C=moles CO per 1000 total carbons. Mols ethylene=(1000−CO units/1000 C)/2.

TABLE B

Comonomer Content of Sample Polymers

| | Code | Shift (ppm) |
| --- | --- | --- |
| $\text{--(CH}_2\overset{A4}{\text{--CH}_2\text{)}_n}\overset{A3}{\text{--CH}_2\text{--}}\overset{A2}{\text{CH}_2\text{--}}\overset{A1}{\underset{\underset{\text{O}}{\|}}{\text{C}}}\text{--}$ | A1 | 207.9 |
| | A2 | 42.8 |
| | A3 | 24.2 |
| | A4 | 30.0 |

Nuclear Magnetic Resonance ($^1$H NMR)

Each sample was prepared by adding approximately 130 mg of sample to "3.25 g of 50/50, by weight, tetrachlorethane-d2/perchloroethylene" with 0.001 M Cr(AcAc)$_3$, in a NORELL 1001-7, 10 mm NMR tube. The sample was purged by bubbling N$_2$ through the solvent, via a pipette inserted into the tube, for approximately five minutes, to prevent oxidation. The tube was capped, sealed with TEFLON tape, and then soaked at room temperature, overnight, to facilitate sample dissolution. The sample was heated and vortexed at 115° C. to ensure homogeneity.

The $^1$H NMR was performed on a Bruker AVANCE 400 MHz spectrometer, equipped with a Bruker Dual DUL high-temperature CryoProbe, and at a sample temperature of 120° C. Two experiments were run to obtain spectra, a control spectrum to quantitate the total polymer protons, and a double presaturation experiment, which suppressed the intense polymer backbone peaks, and enabled high sensitivity spectra for quantitation of the end-groups. The control was run with ZG pulse, 16 scans, AQ 1.64 s, D1 14 s. The double presaturation experiment was run with a modified pulse sequence, 100 scans, AQ 1.64 s, presaturation delay 1 s, relaxation delay 13 s.

The signal from residual $^1$H in TCE-d2 (at 6.0 ppm) was integrated, and set to a value of 100, and the integral from 3 to −0.5 ppm was used as the signal from the whole polymer in the control experiment. For the presaturation experiment, the TCE signal was also set to 100, and the corresponding integrals for unsaturation (vinylene (cis and trans) at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

Melt Strength

Melt strength measurements were conducted on a Gottfert Rheotens 71.97 (Göettfert inc.; Rock Hill, S.C.), attached to a Gottfert Rheotester 2000 capillary rheometer. The melted sample (about 25 to 30 grams) was fed with a Göettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips, located 100 mm below the die, with an acceleration of 2.4 mm/s². The tensile force was recorded as a function of the take-up speed of the nip rolls. Melt strength was reported as the peak or maximum plateau force (cN). The following conditions were used in the melt strength measurements: plunger speed=0.265 mm/second; wheel acceleration=2.4 mm/s²; capillary diameter=2.0 mm; capillary length=30 mm; and barrel diameter=12 mm. Melt strength is reported as the plateau force (cN) before the strand broke.

Dynamic Mechanical Spectroscopy (DMS)

Resins were compression-molded into "3 mm thick×1 inch" circular plaques at 350° F., for 6.5 minutes, under 20,000 lb$_f$ (0.0890 MN) in air. The sample was then taken out of the press, and placed on the counter to cool.

A constant temperature frequency sweep was performed, using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of 2 mm, the sample trimmed (extra sample that extends beyond the circumference of the "25 mm diameter" plate was removed), and then the test was started. The method had an additional five minute delay built in, to allow for temperature equilibrium. The experiments were performed at 190° C., over a frequency range of 0.1 to 100 rad/s. The strain amplitude was constant at 10%. The complex viscosity η*, tan (δ) or tan delta, viscosity at 0.1 rad/s (V0.1), viscosity at 1 rad/s (V1), viscosity at 10 rad/s (V10), the viscosity at 100 rad/s (V100), and the viscosity ratio (V0.1/V100) were measured.

Triple Detector Gel Permeation Chromatography (TDGPC)

The chromatographic system consisted of a PolymerChar GPC-IR (Valencia, Spain) high temperature GPC chromatograph, equipped with an internal IR5 infra-red detector (IR5) coupled to a Precision Detectors (Now Agilent Technologies) 2-angle laser light scattering (LS) detector Model 2040, and followed by a PolymerChar 4-capillary viscosity detector (three detectors in series). For all light scattering measurements, the 15 degree angle was used for measurement purposes. The autosampler oven compartment was set at 160° Celsius, and the column compartment was set at 150° Celsius. The columns used were four, Agilent "Mixed A" columns, each 30 cm, and each packed with 20-micron linear mixed-bed particles. The chromatographic solvent used was 1,2,4-trichlorobenzene, which contained 200 ppm of butylated hydroxytoluene (BHT). The solvent source was nitrogen sparged. The injection volume was 200 microliters, and the flow rate was 1.0 milliliters/minute.

Calibration of the GPC column set was performed with 21 narrow molecular weight distribution, polystyrene standards with molecular weights ranging from 580 to 8,400,000 g/mol. These standards were arranged in 6 "cocktail" mixtures, with at least a decade of separation between individual molecular weights. The standards were purchased from Agilent Technologies. The polystyrene standards were prepared at "0.025 grams in 50 milliliters of solvent" for molecular weights equal to, or greater than, 1,000,000 g/mol, and at "0.05 grams in 50 milliliters of solvent" for molecular weights less than 1,000,000 g/mol. The polystyrene standards were dissolved at 80° C., with gentle agitation, for 30 minutes. The polystyrene standard peak molecular weights (IR 5 detector) were converted to polyethylene molecular weights using Equation 1 (as described in Williams and Ward, J. Polym. Sci., Polym. Let., 6, 621 (1968)):

$$M_{polyethlene} = A \times (M_{polystyrene})^B \quad \text{(EQN 1)},$$

where M is the molecular weight, A has a value of 0.4315, and B is equal to 1.0.

A fifth order polynomial was used to fit the respective polyethylene-equivalent calibration points. A small adjustment to A (from approximately 0.415 to 0.44) was made to correct for column resolution and band-broadening effects, such that NIST standard NIBS 1475 was obtained at 52,000 g/mol (Mw).

The total plate count of the GPC column set was performed with Eicosane (prepared at 0.04 g in 50 milliliters of TCB (1,2,4 TriChloroBenzene) stabilized solvent, and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\ Max})}{\text{Peak Width at } \frac{1}{2} \text{height}} \right)^2, \quad \text{(EQN 2)}$$

where RV is the retention volume in milliliters, the peak width is in milliliters, the peak max is the maximum height of the peak, and ½ height is the ½ height of the peak maximum:

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})}, \quad \text{(EQN 3)}$$

where RV is the retention volume in milliliters, and the peak width is in milliliters, "Peak max" is the maximum IR signal height corresponding to an "RV position" on the chromatogram, "One tenth height" ¹/₁₀ height of the peak maximum, where "Rear peak" refers to the peak tail at a signal retention volume (at ¹/₁₀ height of peak maximum), later than the peak max, and where "Front peak" refers to the peak front at a signal retention volume (at ¹/₁₀ height of peak maximum), earlier than the peak max. The plate count for the chromatographic system should be greater than 24,000, and the symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. Decane (a flow rate marker) was added to each sample (about 5 microliters). The samples were dissolved for two hours at 160° Celsius, under a "low speed" shaking.

IR 5 Chromatogram

The calculations of Mn(conv), Mw(conv), and Mz(conv) were based on the GPC results, using the internal IR5 detector (measurement channel) of the PolymerChar GPC-IR chromatograph, according to Equations 4-6, using PolymerChar GPCOne™ software (version 2013G), the baseline-subtracted IR chromatogram at each equally-spaced data collection point (i), and the polyethylene equivalent molecular weight obtained from the narrow standard calibration curve for the point (i) from Equation 1. Table 4 lists the conventional GPC results for the examples and comparative examples using Equations 4-6, below for the conventional GPC.

$$Mn_{(conv)} = \frac{\sum_{i} IR_i}{\sum_{i} (IR_i / M_{polyethylene_i})},$$ (EQN 4)

$$Mw_{(conv)} = \frac{\sum_{i} (IR_i * M_{polyethylene_i})}{\sum_{i} IR_i},$$ (EQN 5)

$$Mz_{(conv)} = \frac{\sum_{i} (IR_i * M_{polyethylene_i}^2)}{\sum_{i} (IR_i * M_{polyethylene_i})}.$$ (EQN 6)

In order to monitor the deviations over time, a flowrate marker (decane) was introduced into each sample via a micropump controlled with the PolymerChar GPC-IR system. This flowrate marker (FM, here decane) was used to linearly correct the pump flowrate (Flowrate(nominal)) for each sample, by aligning the RV value of the respective decane peak within the sample (RV(FM Sample)), to that of the decane peak within the narrow standards calibration (RV(FM Calibrated)). Any changes in the time of the decane marker peak were then assumed to be related to a linear-shift in flowrate (Flowrate(effective)) for the entire run. To facilitate the highest accuracy of a RV measurement of the flow marker peak, a least-squares fitting routine was used to fit the peak of the flow marker concentration chromatogram to a quadratic equation. The first derivative of the quadratic equation was then used to solve for the true peak position. After calibrating the system based on a flow marker peak, the effective flowrate (with respect to the narrow standards calibration) was calculated using Equation 7. Processing of the flow marker peak was done via the PolymerChar GPCOne™ Software. Acceptable flowrate correction was such that the effective flowrate should be within +/−2% of the nominal flowrate.

Flowrate(effective)=Flowrate(nominal)*(RV(FM Calibrated)/RV(FM Sample)) (EQN 7)

The Systematic Approach for the determination of multidetector offsets was done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)). Alignment of the triple detector log (MW and IV) results (generated from a broad homopolymer polyethylene standard (Mw/Mn=3)), to the narrow standard column calibration results (generated from the narrow standards calibration curve), was done using the PolymerChar GPCOne™ Software.

Light Scattering Chromatogram

The absolute molecular weight data (MWabs) was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)), using the PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight (traceable to NBS 1475 homopolymer polyethylene reference sample). The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mol.

The Equation for Mw(abs) is an area-based result, using the baseline-subtracted 15 degree light scattering signal and the baseline-subtracted IR5 measurement sensor signal (applying the mass and light scattering constants), as determined from GPCOne™ software, $$Mw_{(abs)} = \frac{\sum_{i} LS_i}{\sum_{i} IR_i} \times \text{Mass Constant}/LS \text{ constant.}$$

The equation for Mz(abs) relied on a point-by point determination of the absolute molecular weight derived from the ratio of the baseline-subtracted, 15 degree light scattering signal and the baseline-subtracted, IR5 measurement sensor signal, and factored for the mass constant and light scattering constant, using GPCOne™ software. A straight-line fit was used to extrapolate the absolute molecular weight, where either detector (IR5 or LS) is below approximately 4% relative peak signal height (maximum peak height).

$$Mz(abs) = \frac{\sum_{i} (IR_i * M_{Abs_i}^2)}{\sum (IR_i * M_{Abs_i})}$$

Viscosity Chromatogram

The absolute intrinsic viscosity data (IV(abs)) was obtained using the area of the specific viscosity chromatogram, obtained from the PolymerChar viscometer detector, when calibrated to the known intrinsic viscosity of NBS 1475. The overall injected concentration, used in the determination of the intrinsic viscosity, was obtained from the mass detector area and the mass detector constant, derived from a suitable linear polyethylene homopolymer, or one of the polyethylene standards of known intrinsic viscosity (traceable to NBS 1475 homopolymer polyethylene reference sample).

The equation for IV(abs) is an area-based result using the baseline-subtracted specific-viscosity signal (DV) and the baseline-subtracted IR5 measurement sensor signal (applying the mass and viscosity constants), as determined from GPCOne™ software:

$$IV_{(Abs)} = \frac{\sum_{i} DV_i}{\sum_{i} IR_i} \times (\text{Mass Constant/Viscosity constant}).$$

gpcBR Branching Index by Triple Detector GPC (TDGPC)

The gpcBR branching index was determined by first calibrating the light scattering, viscosity, and concentration detectors as described previously. Baselines were then subtracted from the light scattering, viscometer, and concentration chromatograms. Integration windows were then set, to ensure integration of all of the low molecular weight retention volume range in the light scattering and viscometer chromatograms that indicate the presence of detectable polymer from the refractive index chromatogram. Linear polyethylene standards were then used to establish polyethylene and polystyrene Mark-Houwink constants. Upon obtaining the constants, the two values were used to construct two linear reference conventional calibrations for polyethylene molecular weight and polyethylene intrinsic viscosity as a function of elution volume, as shown in Equations (9) and (10):

$$M_{PE} = \left(\frac{K_{PS}}{K_{PE}}\right)^{1/\alpha_{PE}+1} \cdot M_{PS}^{\alpha_{PS}+1/\alpha_{PE}+1}, \quad \text{(EQN 9)}$$

$$[\eta]_{PE} = K_{PS} \cdot M_{PS}^{\alpha+1} / M_{PE}. \quad \text{(EQN 10)}$$

The gpcBR branching index is a robust method for the characterization of long chain branching as described in Yau, Wallace W., "Examples of Using 3D-GPC—TREF for Polyolefin Characterization," Macromol. Symp., 2007, 257, 29-45. The index avoids the "slice-by-slice" TDGPC calculations traditionally used in the determination of g' values and branching frequency calculations, in favor of whole polymer detector areas. From TDGPC data, one can obtain the sample bulk absolute weight average molecular weight (Mw, Abs) by the light scattering (LS) detector, using the peak area method. The method avoids the "slice-by-slice" ratio of light scattering detector signal over the concentration detector signal, as required in a traditional g' determination.

With TDGPC, sample intrinsic viscosities were also obtained independently using Equations (11). The area calculation in this case offers more precision, because, as an overall sample area, it is much less sensitive to variation caused by detector noise and TDGPC settings on baseline and integration limits. More importantly, the peak area calculation was not affected by the detector volume offsets. Similarly, the high-precision, sample intrinsic viscosity (IV) was obtained by the area method shown in Equation (11):

$$IV = [\eta] = \sum_i w_i IV_i = \quad \text{(EQN 11)}$$

$$\sum_i \left(\frac{C_i}{\sum_i C_i}\right) IV_i = \frac{\sum_i C_i IV_i}{\sum_i C_i} = \frac{\sum_i DP_i}{\sum_i C_i} = \frac{DP \text{ Area}}{\text{Conc. Area}},$$

where DPi stands for the differential pressure signal monitored directly from the online viscometer.

To determine the gpcBR branching index, the light scattering elution area for the sample polymer was used to determine the molecular weight of the sample. The viscosity detector elution area for the sample polymer was used to determine the intrinsic viscosity (IV or [η]) of the sample. Initially, the molecular weight and intrinsic viscosity for a linear polyethylene standard sample, such as SRM1475a or an equivalent, were determined using the conventional calibrations ("cc") for both molecular weight and intrinsic viscosity as a function of elution volume:

$$[\eta]_{CC} = \sum_i \left(\frac{C_i}{\sum_i C_i}\right) IV_i = \sum_i w_i IV_{cc,i}. \quad \text{(EQN 12)}$$

Equation (13) was used to determine the gpcBR branching index:

$$gpcBR = \left[\left(\frac{[\eta]_{CC}}{[\eta]}\right) \cdot \left(\frac{M_W}{M_{W,CC}}\right)^{\alpha_{PE}} - 1\right], \quad \text{(EQN 13)}$$

wherein [η] is the measured intrinsic viscosity, $[\eta]_{cc}$ is the intrinsic viscosity from the conventional calibration (or conv GPC), Mw is the measured weight average molecular weight, and $M_{w,cc}$ is the weight average molecular weight of the conventional calibration. The weight average molecular weight by light scattering (LS) is commonly referred to as "absolute weight average molecular weight" or "Mw(abs)." The $M_{w,cc}$ from using conventional GPC molecular weight calibration curve ("conventional calibration") is often referred to as "polymer chain backbone molecular weight," "conventional weight average molecular weight" and "Mw (conv)."

All statistical values with the "cc or conv" subscript are determined using their respective elution volumes, the corresponding conventional calibration as previously described, and the concentration (Ci). The non-subscripted values are measured values based on the mass detector, LALLS, and viscometer areas. The value of $K_{PE}$ is adjusted iteratively, until the linear reference sample has a gpcBR measured value of zero. For example, the final values for α and Log K for the determination of gpcBR in this particular case are 0.725 and −3.355, respectively, for polyethylene, and 0.722 and −3.993, respectively, for polystyrene. Once the K and α values have been determined using the procedure discussed previously, the procedure was repeated using the branched samples. The branched samples were analyzed using the final Mark-Houwink constants as the best "cc" calibration values.

The interpretation of gpcBR is straight forward. For linear polymers, gpcBR will be close to zero, since the values measured by LS and viscometry will be close to the conventional calibration standard. For branched polymers, gpcBR will be higher than zero, especially with high levels of long chain branching, because the measured polymer molecular weight will be higher than the calculated $M_{w,cc}$, and the calculated IV, will be higher than the measured polymer IV. In fact, the gpcBR value represents the fractional IV change due to the molecular size contraction effect as a result of polymer branching. A gpcBR value of 0.5 or 2.0 would mean a molecular size contraction effect of IV at the level of 50% and 200%, respectively, versus a linear polymer molecule of equivalent weight.

For these particular examples, the advantage of using gpcBR, in comparison to a traditional "g' index" and branching frequency calculations, is due to the higher precision of gpcBR. All of the parameters used in the gpcBR index determination are obtained with good precision, and are not detrimentally affected by the low TDGPC detector response at high molecular weight from the concentration detector.

Errors in detector volume alignment also do not affect the precision of the gpcBR index determination.

Calculation of LCB Frequency

The $LCB_f$ was calculated for each polymer sample by the following procedure:

1) The light scattering, viscosity, and concentration detectors were calibrated with NBS 1475 homopolymer polyethylene (or equivalent reference).

2) The light scattering and viscometer detector offsets were corrected relative to the concentration detector as described above in the calibration section (see references to Mourey and Balke).

3) Baselines were subtracted from the light scattering, viscometer, and concentration chromatograms and set integration windows making certain to integrate all of the low molecular weight retention volume range in the light scattering chromatogram that is observable from the refractometer chromatogram.

4) A linear homopolymer polyethylene Mark-Houwink reference line was established by injecting a standard with a polydispersity of at least 3.0, calculate the data file (from above calibration method), and record the intrinsic viscosity and molecular weight from the mass constant corrected data for each chromatographic slice.

5) The LDPE sample of interest was analyzed, the data file (from above calibration method) was calculated, and the intrinsic viscosity and molecular weight from the mass constant, corrected data for each chromatographic slice, were recorded. At lower molecular weights, the intrinsic viscosity and the molecular weight data may need to be extrapolated such that the measured molecular weight and intrinsic viscosity asymptotically approach a linear homopolymer GPC calibration curve.

6) The homopolymer linear reference intrinsic viscosity was shifted at each point (i) by the following factor: $IV_i = IV_i * 0.964$ where IV is the intrinsic viscosity.

7) The homopolymer linear reference molecular weight was shifted by the following factor: $M = M * 1.037$ where M is the molecular weight.

8) The g' at each chromatographic slice was calculated according to the following equation: $g' = (IV(LDPE)/IV(\text{linear reference}))$, at the same M. The IV(linear reference) was calculated from a fifth-order polynomial fit of the reference Mark-Houwink Plot and where IV(linear reference) is the intrinsic viscosity of the linear homopolymer polyethylene reference (adding an amount of SCB (short chain branching) to account for backbiting through 6) and 7) at the same molecular weight (M)). The IV ratio is assumed to be one at molecular weights less than 3,500 g/mol to account for natural scatter in the light scattering data.

9) The number of branches at each data slice was calculated according to the following equation:

$$\left[\frac{IV_{LDPE}}{IV_{linear\_reference}}\right]_M^{1.33} = \left[\left(1 + \frac{B_n}{7}\right)^{1/2} + \frac{4}{9}\frac{B_n}{\pi}\right]^{-1/2}.$$

10) The average LCB quantity was calculated across all of the slices (i), according to the following equation (here $LCB_{1000C} = LCB_f$)

$$LCB_{1000C} = \frac{\sum_{M=3500}^{i}\left(\frac{B_{n_i}}{14000}c_i\right)}{\sum c_i}.$$

Differential Scanning Calorimetry (DSC)

Differential Scanning Calorimetry (DSC) can be used to measure the melting and crystallization behavior of a polymer over a wide range of temperatures. For example, the TA Instruments Q2000 DSC, equipped with a refrigerated cooling system (RCS) and an autosampler is used to perform this analysis. During testing, a nitrogen purge gas flow of 50 ml/min is used. Each sample is melt pressed into a thin film at about 190° C.; the melted sample is then air-cooled to room temperature (~25° C.). The film sample was formed by pressing a "0.5 to 0.9 gram" sample at 190° C. at 20,000 $lb_f$ (0.0890 MN) and 10 seconds, to form a "0.1 to 0.2 mil thick" film. A 3-10 mg, six mm diameter specimen was extracted from the cooled polymer, weighed, placed in an aluminum pan (about 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for five minutes, in order to remove its thermal history. Next, the sample was cooled to −40° C., at a 10° C./minute cooling rate, and held isothermal at −40° C. for five minutes. The sample was then heated to 150° C. (this is the "second heat" ramp) at a 10° C./minute heating rate. The cooling and second heating curves are recorded. The cooling curve was analyzed by setting baseline endpoints from the beginning of crystallization to −20° C. The heating curve was analyzed by setting baseline endpoints from −20° C. to the end of melting. The values determined were peak melting temperature (Tm), peak crystallization temperature (Tc), heat of fusion (Hf) (in Joules per gram), and the calculated % crystallinity for ethylene-based polymer samples using the following equations: % Crystallinity=((Hf)/(292 J/g))×100 (EQN 14). The heat of fusion and the peak melting temperature are reported from the second heat curve. The peak crystallization temperature is determined from the cooling curve.

Modulus

The pellet samples were compression molded into a plaque at 190° C. to a nominal thickness of 0.125 inch according to ASTM D4703 per Appendix A.1 Procedure C. The plaque was conditioned at 23 (±2) ° C. and 50 (±5) % R.H. for at least 40 hours prior to testing. Rectangular specimens were cut from the molded plaque using a die cutter. The specimens were 5 inches long and 0.5 inches wide. The specimen thickness was measured and the specimen placed in a tensile tester. The initial grip separation (gauge length) was 4 inches. Flat serrated grips were used to grip the specimen. The specimens were tested in tension at a crosshead speed of 2 inches/min. Stress was calculated as (load/cross sectional area). The strain was calculated using the crosshead displacement and initial gauge length, i.e. strain is (displacement/initial gauge length), expressed as a percentage. The modulus is calculated from the slope of the initial (steepest) portion of the stress-strain plot. The 1% and 2% secant moduli are calculated from the slope of the line going through the origin to the stress at, respectively, 1% and 2% strain. ASTM D638 "Standard Test Methods for Tensile Properties of Plastics" is the method used for the modulus measurements; 5 replicates were run for tensile.

Experimental

Preparation of Inventive Ethylene-Based Polymers

Figure 1:
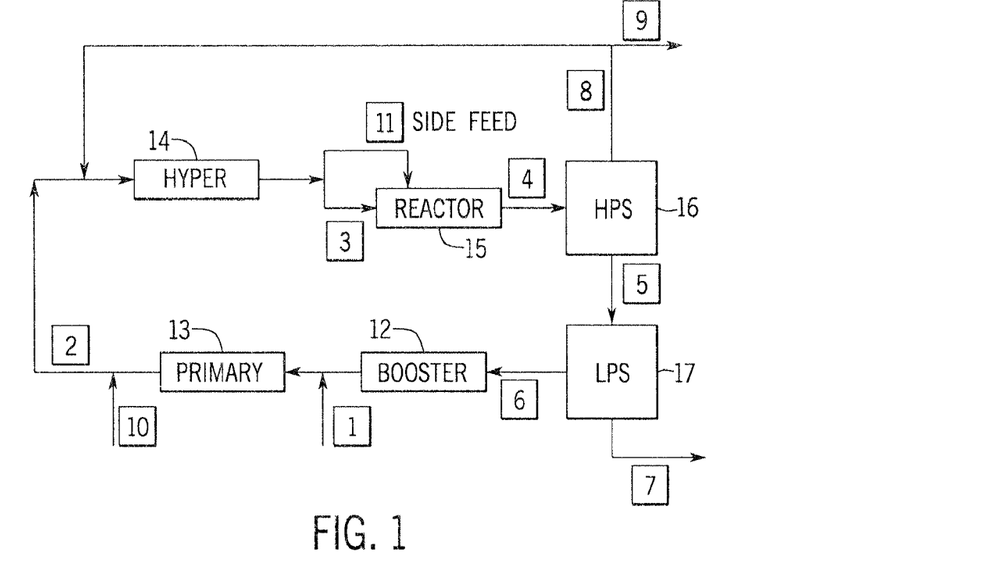
FIG. 1 is a block diagram of a process reaction system used to produce the inventive and comparative ethylene-based polymers.

FIG. 1 is a block diagram of the process reaction system used to produce the inventive ethylene-based polymers (LDPEs). The process reaction system in FIG. 1 is a partially closed-loop, dual recycle, high-pressure, low density polyethylene production system. The process reaction system is comprised of a fresh ethylene feed line [1], a booster [12] and primary compressor ("Primary") [13], a hypercompressor ("Hyper") [14] and a multi zone tubular reactor ("reactor") [15]. Compressed ethylene feed stream [3] is heated by a "pre-heater" (not shown) to a sufficiently high temperature, and fed to the front (first reaction zone) of multi-zone reactor 15. Compressed side stream [11] is fed to a down steam tone of the reactor. In the reactor, polymerization is initiated with the help of multiple mixtures, each containing one or more free radical initiation systems (see Table 1), which are injected at the inlet of each reaction zone (not shown).

The maximum temperature in each reaction zone is controlled at a set point, by regulating the feed amount of the mixture of initiators at the start of each reaction zone. Each reaction zone can have one or two inlets and one outlet. Each inlet stream consists of the outlet stream from the previous zone and/or an added ethylene-rich feed stream, e.g., compressed side stream [11]. Upon completing the polymerization, the reaction mixture is depressurized and cooled in product stream [4]. The process further consists of a high pressure separator "HPS" [16] which separates reaction product [4] into first unreacted ethylene-rich recycle stream [8], which is cooled and recycled back to the suction of the Hyper, and a first polymer-rich stream [5], which is sent to the low pressure separator "LPS" [17] for further separation. In LPS [17], second unreacted ethylene-rich recycle stream [6] is separated from first polymer-rich stream [5] and then cooled and recycled back to booster ("Booster") [12]. From the booster, the second unreacted ethylene-rich recycle stream [6] is mixed with fresh ethylene feed [1] and compressed further by the primary compressor. Compressed, mixed feed [2] is then recycled to the suction of the Hyper. The second polymer-rich stream [7] is also separated from first polymer-rich stream [5] and leaves LPS [7] for further processing, e.g., pelletization and purge. The chain transfer agent "CTA" feed [10] is injected into compressed mixed ethylene stream [2] at the discharge of primary compressor [13]. Purge stream [9] removes impurities and/or inerts from the process. Cooling jackets (using high pressure water) (not shown) are mounted around the outer shell of the tube reactor and pre-heater.

For Example 1 and Comparative Example 1, a mixture containing t-butyl peroxy-2 ethylhexanoate (TBPO), tert-butyl peroxyacetate (TBPA), di-tert-butyl peroxide (DTBP), and an iso-paraffinic hydrocarbon solvent (boiling range 171-191° C.; for example, ISOPAR H) was used as the initiator mixture for the first reaction zone. For the second reaction zone, a mixture containing di-tert-butyl peroxide (DTBP), TBPO, and the iso-paraffinic hydrocarbon solvent was used. In comparison, for Comparative Example 2, for the third reaction zone, a mixture of TBPA, DTBP, and iso-paraffinic hydrocarbon solvent was used. Also note some reaction zones were not fed peroxides, as illustrated by Example 1, having no feed to Reaction Zone 3. This data is summarized in Table 1.

Isobutane or propylene was used as the chain transfer agent (CTA). The concentration of the CTA fed to the process was adjusted to control the melt index of the product. Table 2 shows the polymerization conditions used to form the Inventive and Comparative Examples. The molecular weight of each polymer was also optimized by adjusting the CTA (isobutane or propylene) concentration fed to the reactor.

TABLE 1

Peroxide (PO) Initiator Flows in Pounds per Hour at Each Injection Point

| Reaction Zone | Initiator | Ex. 1 Neat PO lbs/hour | CE 1 Neat PO lbs/hour | Ex. 2' Neat PO lbs/hour |
|---|---|---|---|---|
| #1 | TBPO | 6.1 | 3.5 | 1.7 |
| #1 | TBPA | 2.0 | 1.1 | 0.7 |
| #1 | DTBP | 1.7 | 1.0 | 0.0 |
| #2 | TBPO | 0.6 | 0.4 | 5.1 |
| #2 | TBPA | 0.0 | 0.0 | 1.1 |
| #2 | DTBP | 1.1 | 0.9 | 1.1 |
| #3 | TBPA | 0 | 0 | 0.3 |
| #3 | DTBP | 0 | 0 | 1.0 |

For Example 1 and Comparative Example 2, propylene was used as the chain transfer agent (CTA). The propylene was injected into the ethylene stream at the discharge drum of the primary compressor. The composition of the CTA feed to the process was adjusted to maintain the melt index of the product. For Comparative Example 1, isobutane was used as the CTA and added into the process at the same location as the propylene.

For all the examples, carbon monoxide was used as a comonomer. The carbon monoxide was injected into the ethylene stream at the suction side drum of the first stage booster. The reactor tube process conditions used to manufacture Examples 1 and Comparative Examples 1 and 2 are given in Table 2.

TABLE 2

Process Conditions used to Polymerize Examples

| Process Variables | Ex. 1 | CE 1 | Ex 2' |
|---|---|---|---|
| Reactor Pressure, psig | 37,900 | 37,900 | 38,500 |
| Zone 1 Initiation Temperature (° C.) | 148 | 146 | 159 |
| Zone 1 Peak Temperature (° C.) | 300 | 300 | 270 |
| Zone 2 Initiation Temperature (° C.) | 226 | 230 | 165 |
| Zone 2 Peak Temperature (° C.) | 294 | 294 | 300 |
| Zone 3 Initiation Temperature (° C.) | — | — | 235 |
| Zone 3 Peak Temperature (° C.) | — | — | 290 |
| Fresh Ethylene Flow (lb/hr) | 23,000 | 23,000 | 25,000 |
| Ethylene Throughput to Tube Reactor (lb/hr) | 100,200 | 99,500 | 100,300 |
| Ethylene Conversion (%) | 21.3 | 20.6 | 23.3 |
| Chain Transfer Agent (CTA) | Propylene | Isobutane | Propylene |
| Isobutane Flow (lb/hr) | 0 | 50 | 0 |
| Propylene Flow (lb/hr) | 190 | 0 | 200 |
| Ethylene Purge Flow (lb/hr) | 500 | 600 | 800 |
| Recycle Propylene Concentration (wt %) | 0.95 | 0 | 0.8 |
| Recycle Isobutane Concentration (wt %) | 0 | 1.6 | 0 |
| CO Flow (lb/hr) | 220 | 210 | 240 |
| Pre-heater Temperature (° C.) | 208 | 208 | 204 |
| Reactor Cooling System 1 Temperature (° C.) | 188 | 188 | 188 |
| Reactor Cooling System 2 Temperature (° C.) | 188 | 188 | 188 |

Properties of Example 1 and the other examples are listed in Tables 3-8. Table 3 contains the melt index (I2), density, melt strength, wt % hexane extractables, modulus, 1% secant modulus, and 2% secant modulus. Example 1 is lower in density than Comparative Example 1, by 0.0022 g/cc units. This lowering of density is critical to the design of Example 1, in order to provide a lower modulus material.

Figure 2:
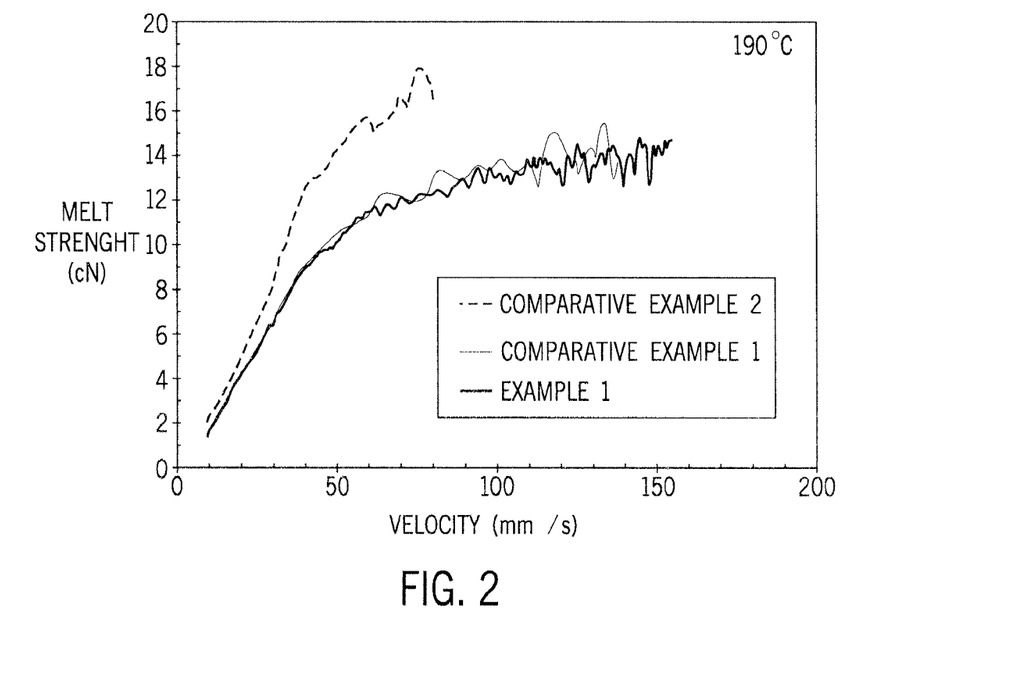
FIG. 2 depicts melt strength vs. velocity, at 190° C., for inventive and comparative examples.

Example 2' has a higher melt strength than Example 1 by 3 cN. The melt strength curves are shown in FIG. 2. Example 2' could be formed into a film or sheet, but is less preferred than Example 1, since Example 2' had higher melt strength, which may lead to process complications.

The melt index and wt % hexane extractables are similar and generally acceptable for all samples in Table 3. The modulus results in Table 3 show the desired differences, especially between Example 1 and Comparative Example 1. The modulus shown has a 12-13% reduction for Example 1, as compared to Comparative Example 1. This lower modulus provides a much softer, more flexible material, when formed into a sheet or film. Table 4 contains the results from the triple detector gel permeation chromatography (TDGPC). In general for these results, Example 1 and Comparative Example 1 are fairly similar and acceptable.

Table 5 contains the DMS viscosity data, as summarized by the following: the viscosities measured at 0.1, 1, 10, and 100 rad/s; the viscosity ratio or the ratio of the viscosity measured at 0.1 rad/s to the viscosity measured at 100 rad/s, each measured at 190° C.; and the tan delta measured at 0.1 rad/s and 190° C. All Examples and Comparative Example are relatively similar in their DMS behavior, which is primarily controlled by the melt index 12, which is similar for all samples. Table 6 contains the CO (carbon monoxide) content, and the branches per 1000 C as measured by $^{13}$C NMR. These polymers contain amyl, or C5 branches, which are not contained in substantially linear polyethylenes, such as AFFINITY Polyolefin Plastomers, or LLDPE, such as DOWLEX Polyethylene Resins, both produced by The Dow Chemical Company. All samples shown contain a similar level of CO. CE 1 contains no C1 branches, since isobutane, rather than propylene, was used as the CTA. Other branching levels are relatively similar, although Example 1 does show the lowest level of C6+, which is related to less long chain branching. Table 7 contains unsaturation results by $^1$H NMR. CE1 does show some differences, largely due to its different CTA. Table 8 contains the DSC results, including melting point (Tm), the heat of fusion, the percent crystallinity, and the crystallization point. Example 1 does have a lower melting point and crystallization point as compared to the higher density Comparative Example 1.

TABLE 3

Melt Index (I2), Density, Melt Strength (MS), wt % Hexane Extractables, and Modulus, 1% Secant Modulus, and 2% Secant Modulus

|  | I2 (190 C.) | Density (g/cc) | Melt Strength (cN) | Wt % Hexane Extractables | Modulus (psi) | 1% Secant Modulus (psi) | 2% Secant Modulus (psi) |
|---|---|---|---|---|---|---|---|
| Ex. 1 | 0.56 | 0.9269 | 14.7 | 1.28 | 33,519 | 33,555 | 30,412 |
| CE 1 | 0.52 | 0.9291 | 15.4 | 1.15 | 38,418 | 38,480 | 34,492 |
| Ex. 2' | 0.49 | 0.9265 | 17.7 | 1.32 | 32,420 | 32,410 | 29,291 |

TABLE 4

TDGPC-Related Properties

| Sample | Mn (conv) (g/mol) | Mw (conv) (g/mol) | Mz (conv) (g/mol) | GPC (conv) Mw/Mn |
|---|---|---|---|---|
| Ex. 1 | 18,072 | 113,628 | 394,933 | 6.29 |
| CE 1 | 17,917 | 116,744 | 408,578 | 6.52 |
| Ex. 2' | 18,528 | 133,981 | 453,377 | 7.23 |

| Sample | Mw (abs) g/mol | Mz(abs) (g/mol) | Mz(abs)/ Mw(abs) | Mz(abs)/ Mw(conv) | LCB$_f$ | gpcBR |
|---|---|---|---|---|---|---|
| Ex. 1 | 239,131 | 3,487,517 | 14.58 | 2.10 | 2.15 | 1.83 |
| CE 1 | 246,538 | 3,542,054 | 14.37 | 2.11 | 1.99 | 1.85 |
| Ex. 2' | 300,017 | 3,125,241 | 10.42 | 2.24 | 2.36 | 2.20 |

TABLE 5

Viscosities in Pa · s, Viscosity Ratio, and Tan Delta, all at 190° C.

| Sample | Visc. 0.1 rad/s | Visc. 1 rad/s | Visc. 10 rad/s | Visc. 100 rad/s | Visc Ratio V 0.1/V 100 | Tan Delta 0.1 rad/s |
|---|---|---|---|---|---|---|
| Ex. 1 | 21,506 | 9,100 | 2,833 | 711 | 30.25 | 2.05 |
| CE 1 | 22,798 | 9,358 | 2,860 | 710 | 32.11 | 1.93 |
| Ex. 2' | 22,753 | 9,340 | 2,861 | 710 | 32.07 | 1.91 |

TABLE 6

Branching Results by $^{13}$C NMR per 1000 C.

| Sample | C1 | 1,3 diethyl branches | C2 on Quat Carbon | C4 | C5 | C6+ | Mol or Wt % CO |
|---|---|---|---|---|---|---|---|
| Ex 1 | 2.48 | 3.09 | 0.98 | 5.44 | 1.58 | 2.5 | 0.79 |
| CE 1 | ND | 2.87 | 1.02 | 5.58 | 1.71 | 2.8 | 0.78 |
| Ex. 2' | 1.84 | 3.04 | 1.21 | 5.58 | 1.67 | 3.0 | 0.78 |

ND = not detected.

TABLE 7

Unsaturation Results by $^1$H NMR

| Sample | Vinyl/ 1000 C. | Cis and Trans/ 1000 C. | Trisub/ 1000 C. | Vinylidene/ 1000 C. | Total Unsaturation/ 1000 C. |
|---|---|---|---|---|---|
| Ex 1 | 0.173 | 0.072 | 0.030 | 0.122 | 0.40 |
| CE 1 | 0.050 | 0.057 | 0.028 | 0.114 | 0.25 |
| Ex. 2' | 0.161 | 0.078 | 0.036 | 0.137 | 0.41 |

TABLE 8

DSC Results

| Sample | $T_{ml}$ (° C.) | Heat of Fusion (J/g) | % Crystallinity | $T_{cl}$ (° C.) |
|---|---|---|---|---|
| Ex. 1 | 108.6 | 138.8 | 47.5 | 96.9 |
| CE 1 | 111.0 | 136.5 | 46.7 | 99.1 |
| Ex. 2' | 108.1 | 138.5 | 47.4 | 96.2 |

What is claimed is:

1. A composition comprising an ethylene-based polymer consisting of ethylene, carbon monoxide, and propylene, wherein the ethylene-based polymer has the following properties:
   (A) a CO content from 0.2 to 0.9 weight percent CO (carbon monoxide), based on the weight of the polymer; and
   (B) a melt index ($I_2$) from 0.3 to 1.0 g/10 min; and
   (C) a density from 0.923 to 0.928 g/cc; and
   (D) a 2% secant modulus (measured on a compression molded plaque) in the range of 27,000 to 34,000 psi; and
   (F) C1 branching; and
wherein the ethylene-based polymer has a melting point, Tm, in ° C., that meets the following relationship: Tm (° C.)<601.4*(Density in g/cc) 447.8° C.

2. The composition of claim 1, wherein the ethylene-based polymer has a MWD(conv) from 4.0 to 10.0.

3. The composition of claim 1, wherein the ethylene-based polymer is formed from a high pressure, free-radical polymerization.

4. The composition of claim 1, wherein the ethylene-based polymer has a melting point, Tm, in ° C., that meets the following relationship: Tm (° C.)<601.4*(Density in g/cc)−448.5 (0C).

5. The composition of claim 1, wherein the ethylene-based polymer has a melt strength(190°) less than, or equal to, 17.0 cN.

6. The composition of claim 1, wherein the ethylene-based polymer has an amyl group level greater than, or equal to, 0.5 amyl group per 1000 carbon atoms, as determined by 13C NMR.

7. The composition of claim 1, wherein the ethylene-based polymer has a melt strength of at least 10.0 cN.

8. An article comprising at least one component formed from the composition of claim 1.

9. The article of claim 8 in the form of a film or sheet.

10. The composition of claim 1, wherein the ethylene-based polymer has a melting temperature from 105° C. to 110° C.

* * * * *